United States Patent
Shan et al.

(10) Patent No.: US 10,226,980 B2
(45) Date of Patent: Mar. 12, 2019

(54) COOLING SYSTEM FOR VEHICLE BATTERY PACK

(71) Applicant: DENSO CORPORATION, Kariya, Aichi-pref. (JP)

(72) Inventors: Zhiwei Shan, Farmington Hills, MI (US); Kota Sakamoto, Novi, MI (US)

(73) Assignee: DENSO CORPORATION, Kariya, Aichi-pref. (JP)

( * ) Notice: Subject to any disclaimer, the term of this patent is extended or adjusted under 35 U.S.C. 154(b) by 15 days.

(21) Appl. No.: 15/467,624

(22) Filed: Mar. 23, 2017

(65) Prior Publication Data

US 2017/0297407 A1    Oct. 19, 2017

Related U.S. Application Data

(60) Provisional application No. 62/322,979, filed on Apr. 15, 2016.

(51) Int. Cl.
*B60H 1/00* (2006.01)
*B60H 1/32* (2006.01)

(52) U.S. Cl.
CPC ..... *B60H 1/00278* (2013.01); *B60H 1/00385* (2013.01); *B60H 1/3205* (2013.01); *B60H 2001/00307* (2013.01); *B60H 2001/3285* (2013.01)

(58) Field of Classification Search
CPC ........ B60H 1/00278; F25B 5/02; F25B 41/04; F25B 43/006
See application file for complete search history.

(56) References Cited

U.S. PATENT DOCUMENTS

| 9,694,646 | B2 * | 7/2017 | Takeuchi | F25B 5/00 |
| 9,780,422 | B2 * | 10/2017 | Dunn | B60H 1/00278 |
| 2009/0249802 | A1 * | 10/2009 | Nemesh | B60H 1/00278 62/56 |
| 2009/0249807 | A1 * | 10/2009 | Nemesh | B60H 1/00278 62/117 |
| 2013/0025311 | A1 | 1/2013 | Graaf et al. | |
| 2014/0216086 | A1 * | 8/2014 | Ohno | B60H 1/00278 62/228.1 |
| 2015/0217623 | A1 | 8/2015 | Hatakeyama et al. | |
| 2015/0308719 | A1 | 10/2015 | Gebbie et al. | |
| 2017/0088006 | A1 * | 3/2017 | Blatchley | B60H 1/00278 |

* cited by examiner

*Primary Examiner* — Christopher R Zerphey
(74) *Attorney, Agent, or Firm* — Harness, Dickey & Pierce, P.L.C.

(57) ABSTRACT

A system for cooling a battery. The system has a cabin cooling refrigerant pathway including an orifice tube through which refrigerant flows to an evaporator. A battery cooling refrigerant pathway includes a thermal expansion valve (TXV) through which refrigerant flows to a chiller. An accumulator is in receipt of refrigerant from both the cabin cooling refrigerant pathway and the battery cooling refrigerant pathway. A battery coolant loop includes a coolant pathway for directing coolant from the chiller to the battery to cool the battery. The coolant is cooled by the chiller.

18 Claims, 4 Drawing Sheets

COOLING SYSTEM FOR VEHICLE BATTERY PACK

CROSS-REFERENCE TO RELATED APPLICATION

This application claims the benefit and priority of U.S. Ser. No. 62/322,979 filed Apr. 15, 2016, the entire disclosure of which is incorporated herein by reference.

FIELD

The present disclosure relates to a cooling system for a vehicle battery pack.

BACKGROUND

This section provides background information related to the present disclosure, which is not necessarily prior art.

Electric vehicles include a battery pack, which supplies power to partially or fully propel the vehicle. Cooling systems are typically required to cool the battery pack, particularly when the vehicle is operating in a warm environment. While existing cooling systems are suitable for their intended use, they are subject to improvement. The present teachings include improved systems and methods for cooling a battery pack of a vehicle, which provide numerous advantages over existing systems and methods as explained herein and as one skilled in the art will appreciate.

SUMMARY

This section provides a general summary of the disclosure, and is not a comprehensive disclosure of its full scope or all of its features.

The present teachings include a system for cooling a battery. The system has a cabin cooling refrigerant pathway including an orifice tube through which refrigerant flows to an evaporator. A battery cooling refrigerant pathway includes a thermal expansion valve (TXV) through which refrigerant flows to a chiller. An accumulator is in receipt of refrigerant from both the cabin cooling refrigerant pathway and the battery cooling refrigerant pathway. A battery coolant loop includes a coolant pathway for directing coolant from the chiller to the battery to cool the battery. The coolant is cooled by the chiller.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
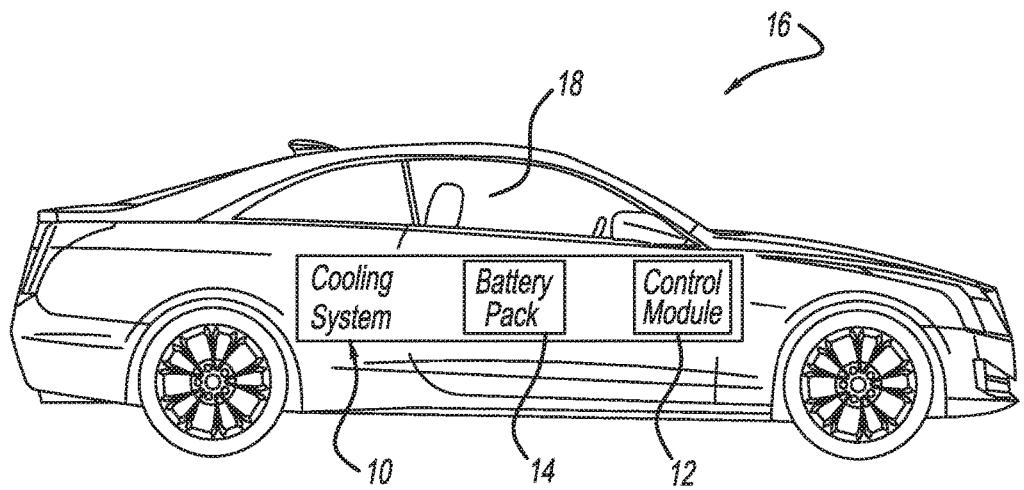
FIG. 1 illustrates an exemplary vehicle including a cooling system according to the present teachings for cooling a battery of the vehicle.

With initial reference to FIG. 1, a cooling system in accordance with the present teachings is generally illustrated at reference numeral 10. The cooling system 10 is controlled by control module 12, and is configured to heat a battery pack 14. The battery pack 14 can be any suitable type of battery pack that needs to be heated. For example and as illustrated in FIG. 1, the cooling system 10 can be included with an exemplary vehicle 16, and the battery pack 14 can be a battery pack suitable to provide power for at least partially propelling the vehicle 16. As explained further herein, the cooling system 10 is also configured to cool a passenger cabin 18 of the vehicle 16.

The vehicle 16 can be any suitable type of vehicle, such as any suitable passenger vehicle, mass transit vehicle, recreational vehicle, commercial vehicle, construction equipment/vehicle, mining equipment/vehicle, watercraft, aircraft, etc. The cooling system 10 can also be used with any suitable non-vehicle to cool a battery, as well as a room or other space. For example, the cooling system 10 can be included with any suitable building system, such as any suitable commercial, residential, or public building, to cool any suitable battery pack (e.g., infrastructure battery pack), and cool any suitable room or space.

In this application, including the definitions below, the term "module," such as with respect to the control module 12, may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features described herein, such as the features of the systems 10 and 210, and the method 110. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

With continued reference to FIG. 1, and additional reference to FIG. 2, additional details of the cooling system 10 will now be described. The cooling system 10 includes a refrigerant line 30, which can be any suitable conduit configured to conduct any suitable refrigerant. The refrigerant line 30 includes a junction or split 32, which splits the refrigerant line into a cabin cooling refrigerant pathway 40 and a battery cooling refrigerant pathway 50. The portion of the refrigerant line 30 between the condenser 64 and the split 32 is sometimes referred to herein as a condenser outlet pathway.

The cabin cooling refrigerant pathway 40 includes valve A (first valve) 42, an orifice tube 44, and an evaporator 46. The refrigerant line 30 is arranged to transport refrigerant through valve A 42, orifice tube 44, the evaporator 46, and into an accumulator 60. Valve A 42 can be any suitable valve that can be selectively opened and closed, such as a magnet valve. Valve A 42 is controlled by the control module 12, and thus opens and closes in response to a signal received from the control module 12, as explained further herein. The orifice tube 44 is any suitable orifice tube, such as any suitable conventional cooling system orifice tube. The evaporator 46 is any suitable conventional evaporator, and is arranged to absorb heat within the passenger cabin 18 (or any other suitable room or space) in order to cool the passenger cabin 18 (or any other suitable room or space). The accumulator 60 is any suitable conventional cooling system accumulator.

The battery cooling refrigerant pathway 50 includes valve B (second valve) 52, thermal expansion valve (TXV) 54, and chiller 58. As explained further herein, in some applications the TXV 54 can include a heater 56. When activated, the heater 56 causes the TXV 54 to open, which allows refrigerant to flow therethrough. Valve B 52 is any suitable valve that can be opened and closed in response to receipt of a signal from the control module 12, such as a magnet valve. The thermal expansion valve 54 is any suitable conventional thermal expansion valve used in conventional cooling systems. The chiller 58 is any suitable chiller, such as any suitable evaporator, configured to absorb heat from coolant flowing through battery coolant loop 70, as explained further herein.

Refrigerant flowing through refrigerant line 30 flows from the split 32 through the battery cooling refrigerant pathway 50 to the accumulator 60. Specifically, the refrigerant flows through valve B 52 (when open), through TXV 54 (when open), across the chiller 58, and to the accumulator 60. As explained further herein, low pressure gas flows from the accumulator 60 to a compressor 62, which pressurizes the gas, and subsequently to condenser 64, which radiates heat from the high pressure gas refrigerant. Exiting the condenser 64 is a high pressure liquid refrigerant, which the refrigerant line 30 directs back to the split 32.

The battery coolant loop 70 includes a coolant line 72 configured to conduct any suitable coolant through the battery coolant loop 70. The coolant is pumped through the battery coolant loop 70 by a pump 74. The pump 74 can be arranged at any suitable location about the battery coolant loop 70. The battery coolant loop 70 further includes a three-way valve 76, which is arranged along the coolant line 72 to direct coolant across the chiller 58 or through bypass line 78, which bypasses the chiller 58. Coolant that has been cooled by the chiller 58, as well as coolant that has bypassed the chiller 58 through bypass line 78, is pumped by the pump 74 to the battery pack 14 to cool the battery pack 14.

The three-way valve 76 can be any suitable valve or other device or structure configured to direct coolant across the chiller 58, or through bypass line 78 based on the cooling needs of the battery pack 14 (such as based on battery temperature). For example, the three-way valve 76 can be an active valve configured to direct more coolant through the chiller 58 (and thus less coolant through bypass line 78) when battery cooling needs are high. When battery cooling needs are low, the three-way valve 76 can be configured to direct less coolant through the chiller 58 (and more coolant through bypass line 78). When more coolant flows through the chiller 58, the refrigerant temperature at the outlet of the chiller 58 will increase. The TXV 54 will sense this temperature increase, and in response will open to allow more refrigerant to flow through the chiller 58.

The cooling system 10 can be configured to operate in various cooling modes, such as an evaporator only cooling mode in which the control module 12 closes valve B 52 so that refrigerant flows through the cabin cooling refrigerant pathway 40, and does not flow through the battery cooling refrigerant pathway 50. In the evaporator only cooling mode, refrigerant is compressed by the compressor 62 to provide the refrigerant as a high pressure gas. The high pressure gas flows to the condenser 64, which allows heat to radiate from the high pressure gas, and condenses the gas into a high pressure liquid. The high pressure liquid refrigerant flows from the condenser 64, through the split 32, through the open valve A 42, and to the orifice tube 44. As the high pressure liquid refrigerant flows through the orifice tube 44, the high pressure liquid refrigerant is converted to low pressure, low temperature two-phase refrigerant, which flows to the evaporator 46. At the evaporator 46, the low pressure, low temperature refrigerant absorbs heat from the passenger cabin 18 to thereby cool the passenger cabin 18. The refrigerant exits the evaporator 46 as a low pressure saturated gas, and flows to the accumulator 60.

The cooling system 10 can also be configured to operate in a combined evaporator cooling and chiller cooling mode. In the combined evaporator cooling and chiller cooling mode, valve A 42 is opened by the control module 12 to allow refrigerant to flow through the cabin cooling refrigerant pathway 40, as explained above, in order to cool the passenger cabin 18. Valve B 52 is also opened by the control module 12 in order to allow refrigerant to pass through the battery cooling refrigerant pathway 50, thereby cooling the coolant flowing through the battery coolant loop 70, and ultimately cooling the battery pack 14.

Specifically, high pressure liquid refrigerant flows from the condenser 64 to the battery cooling refrigerant pathway 50 from the split 32. This refrigerant flows through open valve B 52, and through the TXV 54. As the high pressure liquid refrigerant flows through the TXV 54, the refrigerant becomes a low pressure, low temperature two-phase refrigerant. The low pressure, low temperature two-phase refrigerant flows across the chiller 58, which is in communication with the battery coolant loop 70. The chiller 58 acts as an evaporator to absorb heat from the coolant of the battery coolant loop 70. The refrigerant exits the chiller 58 as a low pressure superheated gas, and flows to the accumulator 60. In the evaporator cooling and chiller cooling mode, the cooling system 10 advantageously regulates refrigerant flow through the cabin cooling refrigerant pathway 40 and the battery cooling refrigerant pathway 50 to make sure that the evaporator 46 receives a sufficient amount of refrigerant to allow the evaporator 46 to effectively cool the passenger cabin 18. The control module 12 controls the speed of the compressor 62 to meet a cooling performance target of the evaporator 46. Similarly, an evaporator temperature controller of the control module 12 controls the three-way valve 76 to meet a chiller cooling performance target of the chiller 58.

The cooling system 10 can also be configured to operate in a chiller cooling only mode. In the chiller cooling only mode, the control module 12 opens valve B 52, and keeps valve B 52 open for the duration of the chiller cooling only mode. As a result, refrigerant flows through the battery cooling refrigerant pathway 50, through valve B 52, through TXV 54, through chiller 58, and to the accumulator 60, as described above. When the TXV 54 does not include the heater 56, superheated refrigerant gas may flow out from the chiller 58 and enter the accumulator 60. The control module 12 is configured to open and close valve A 42 during the chiller cooling only mode as follows: the control module 12 closes valve A 42, and maintains valve A 42 closed until the subcool temperature of refrigerant flowing from the condenser 64 to valve B 52 (which is in the form of a high pressure, sub-cooled liquid) becomes too high, such as 12° C.

The flow of super-heated gas refrigerant to the accumulator 60 may undesirably dry out the accumulator 60. To prevent the accumulator 60 from drying out, when the subcool temperature at the condenser outlet is increased to 12° C., which indicates that the accumulator 60 is beginning to dry out and extra liquid refrigerant is accumulating at the condenser outlet, the control module 12 will send a signal to open valve A 42. When valve A 42 is open, refrigerant will flow through valve A 42, through the orifice tube 44, and through the evaporator 46 to the accumulator 60, and enter the accumulator 60 as a low pressure liquid-rich two-phase flow because the evaporator 46 will not be activated to cool the passenger cabin 18. The liquid refrigerant deposited in the accumulator 60 will prevent the accumulator 60 from drying out due to the presence of the super-heated gas refrigerant passing from the chiller 58.

The control module 12 will maintain valve A 42 open for a predetermined period of time, such as 30-40 seconds, in order to allow enough liquid refrigerant to enter the accumulator 60 and prevent the accumulator 60 from drying out. After the predetermined period of time expires, the control module 12 will close valve A 42. The present teachings thus advantageously provide for the use of the TXV 54 in the battery cooling refrigerant pathway 50, and eliminate any potential for the accumulator 60 drying out prematurely. As explained above, as the refrigerant passes through the chiller 58, the chiller 58 draws heat from the coolant of the battery coolant loop 70 to ensure that coolant cycled through the battery coolant loop 70 is of a temperature sufficient to cool the battery pack 14.

Figure 2:
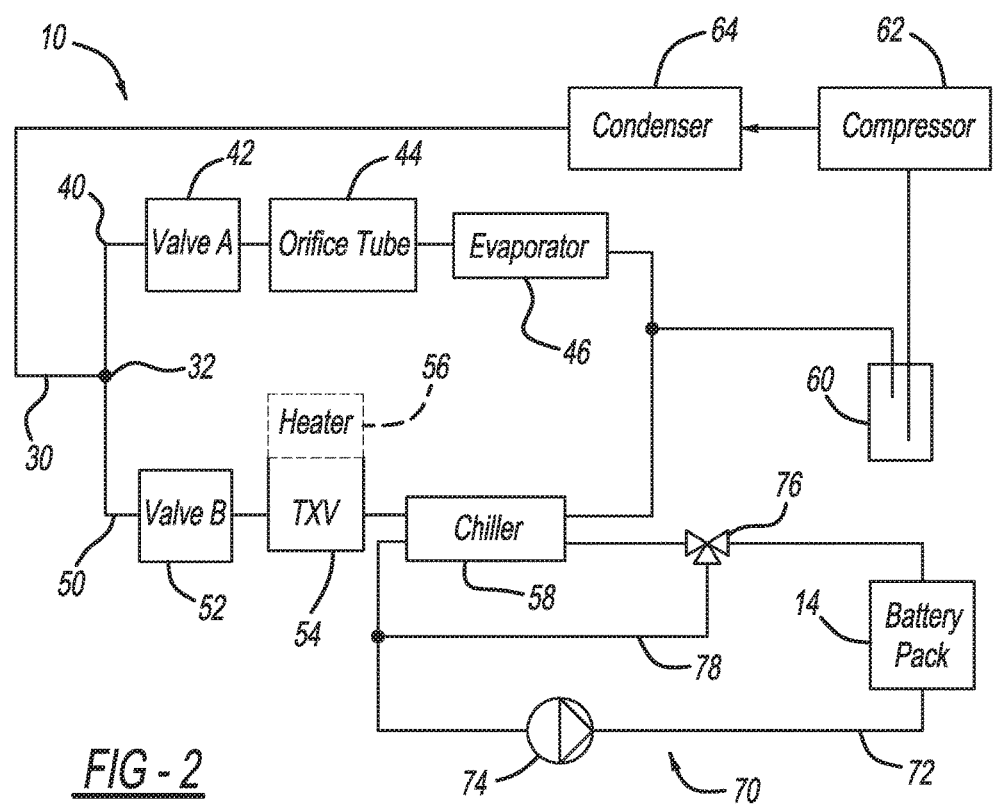
FIG. 2 illustrates an exemplary cooling system according to the present teachings.
Figure 3A:
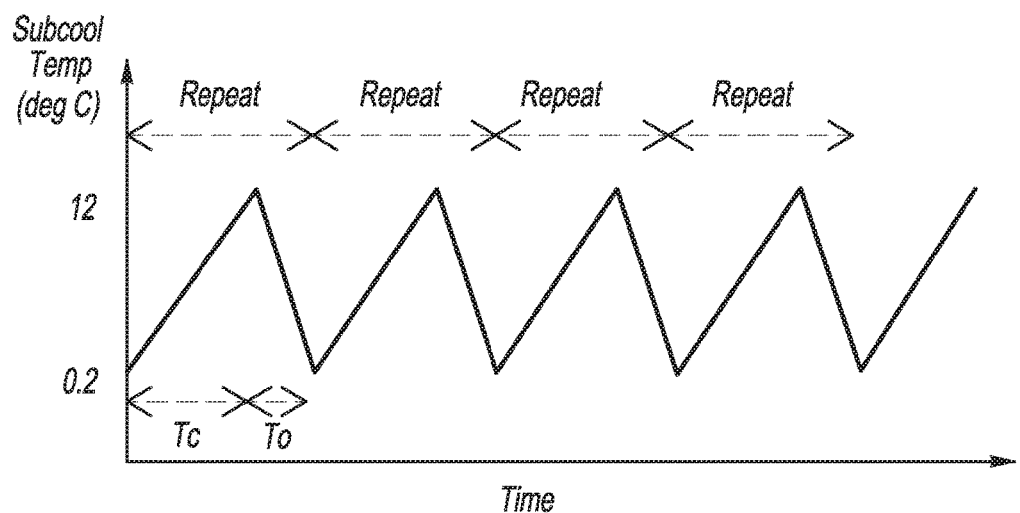
FIG. 3A is a chart that illustrates the subcooled temperature of refrigerant at a condenser outlet over time.
Figure 3B:
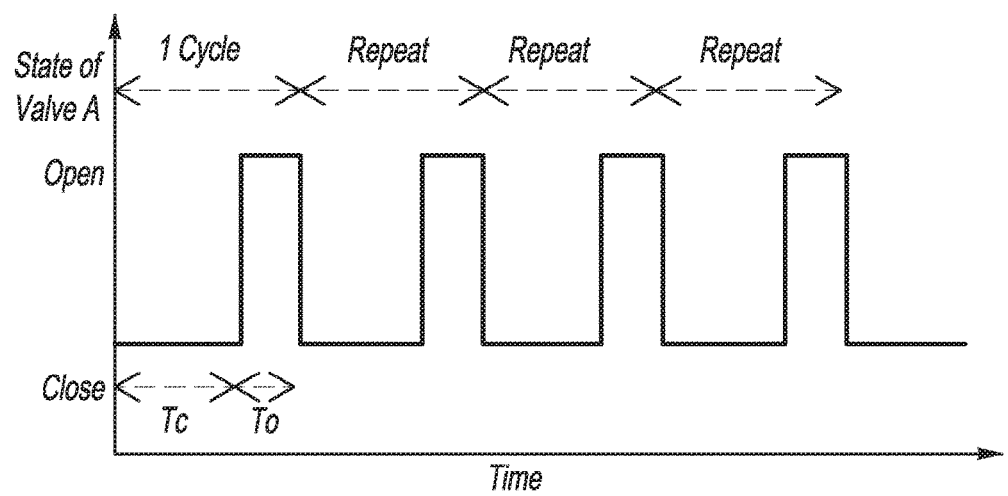
FIG. 3B is a chart that indicates whether a valve of the cooling system is open or closed at different points in time.

With continued reference to FIG. 2, and additional reference to FIGS. 3A and 3B, the control module 12 repeatedly opens and closes valve A 42 throughout the chiller cooling only mode as the subcool temperature of the refrigerant flowing out from condenser 64 fluctuates. As illustrated in FIGS. 3A and 3B, for example, when the subcool temperature of the refrigerant reaches the predetermined temperature, such as 12° C., the control module 12 opens valve A 42, and maintains valve A 42 open for a predetermined period of time, such as 30-40 seconds. After the predetermined period of time, during which the temperature of the refrigerant decreases, such as to about 0.2° C., the control module 12 closes valve A 42. The opening and closing of valve A 42 in response to the temperature of the refrigerant then repeats as illustrated in FIGS. 3A and 3B.

Figure 4:
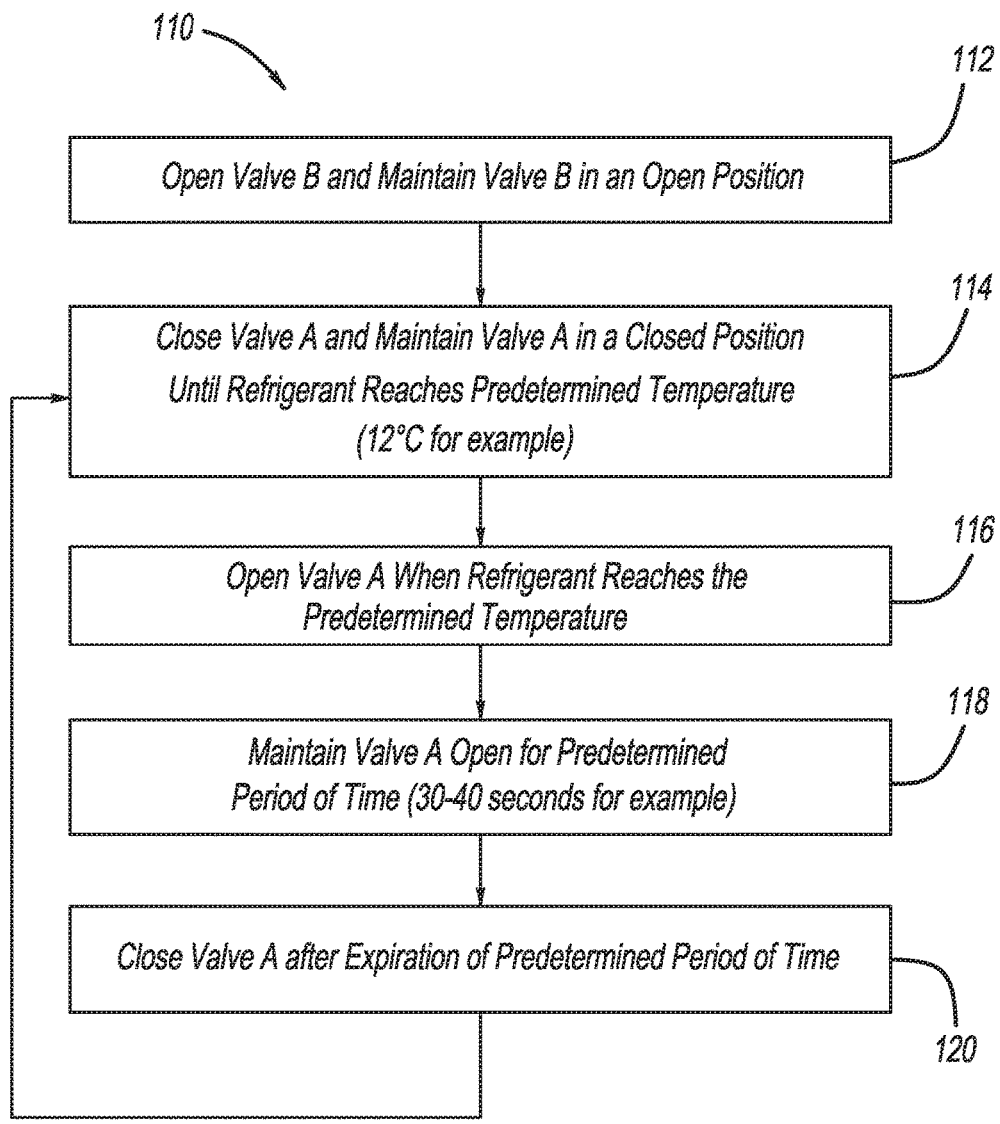
FIG. 4 illustrates a method according to the present teachings for cooling a battery of a vehicle.

With additional reference to FIG. 4, an exemplary method for operating a cooling system for a battery pack of an electric vehicle, such as system 10, system 210 of FIG. 5, or any other suitable system, will now be described. Although the method 110 is described as being performed by the control module 12, and in conjunction with the cooling system 10, the method 110 can be performed by any suitable control module, and can be used with any suitable cooling system. The exemplary method 110 is a chiller cooling mode.

With reference to block 112, the control module 12 opens valve B 52, and maintains valve B 52 in an open position for the duration of the chiller cooling only mode. With reference to block 114, the control module 12 closes valve A 42, and maintains valve A 42 closed until refrigerant flowing out from condenser 64 to junction 32 rises to a predetermined subcool temperature, such as 12° C. With reference to block 116, when the temperature of the refrigerant rises to 12° C., the control module 12 opens valve A 42. With reference to block 118, the control module 12 maintains valve A 42 in an open position for a predetermined period of time to allow the subcool temperature of the refrigerant at the outlet of the condenser 64 to be reduced to an acceptable level, such as 0.2° C. The predetermined period of time can be 30-40 seconds, for example.

With reference to block 120, after expiration of the predetermined period of time, which should correspond to a decrease in the subcool temperature of the refrigerant to an acceptable level (such as 0.2° C., for example) the control module 12 will close valve A 42. From block 120, the method 110 returns to block 114, and the method 110 is repeated as the subcool temperature of the refrigerant flowing out from condenser 64 fluctuates. As explained above, method 110 advantageously prevents the accumulator 60 from drying out due to excess super-heated gas flowing thereto from the chiller 58, by introducing liquid refrigerant to the accumulator 60 from the cabin cooling refrigerant pathway 40.

In applications including the heater 56 mounted to the TXV 54, in the chiller cooling only mode the control module 12 closes valve A 42, and maintains valve A 42 closed for the entire chiller cooling only mode. In contrast, the control module 12 opens valve B 52 in the chiller cooling only mode, and maintains valve B 52 open for the entire chiller cooling only mode. The control module 12 also activates the heater 56, which causes the TXV 54 to open. Due to the heater 56, the TXV will no longer sense the real temperature of the refrigerant. The heater 56 can be arranged on top of a dome of valve B 52, which senses temperature of refrigerant flow through the TXV 54. Heat from the heater 56 will be sensed by the temperature sensing dome, and will result in the TXV 54 being open throughout the cooling only mode. As a result, the TXV 54 will function similar to the orifice tube 44. Saturated gas flowing from the chiller 58 to the accumulator 60 will not dry out the accumulator because the refrigerant gas flow into the accumulator 60 is already in a saturated state so it will not evaporate the liquid refrigerant inside the accumulator 60.

Figure 5:
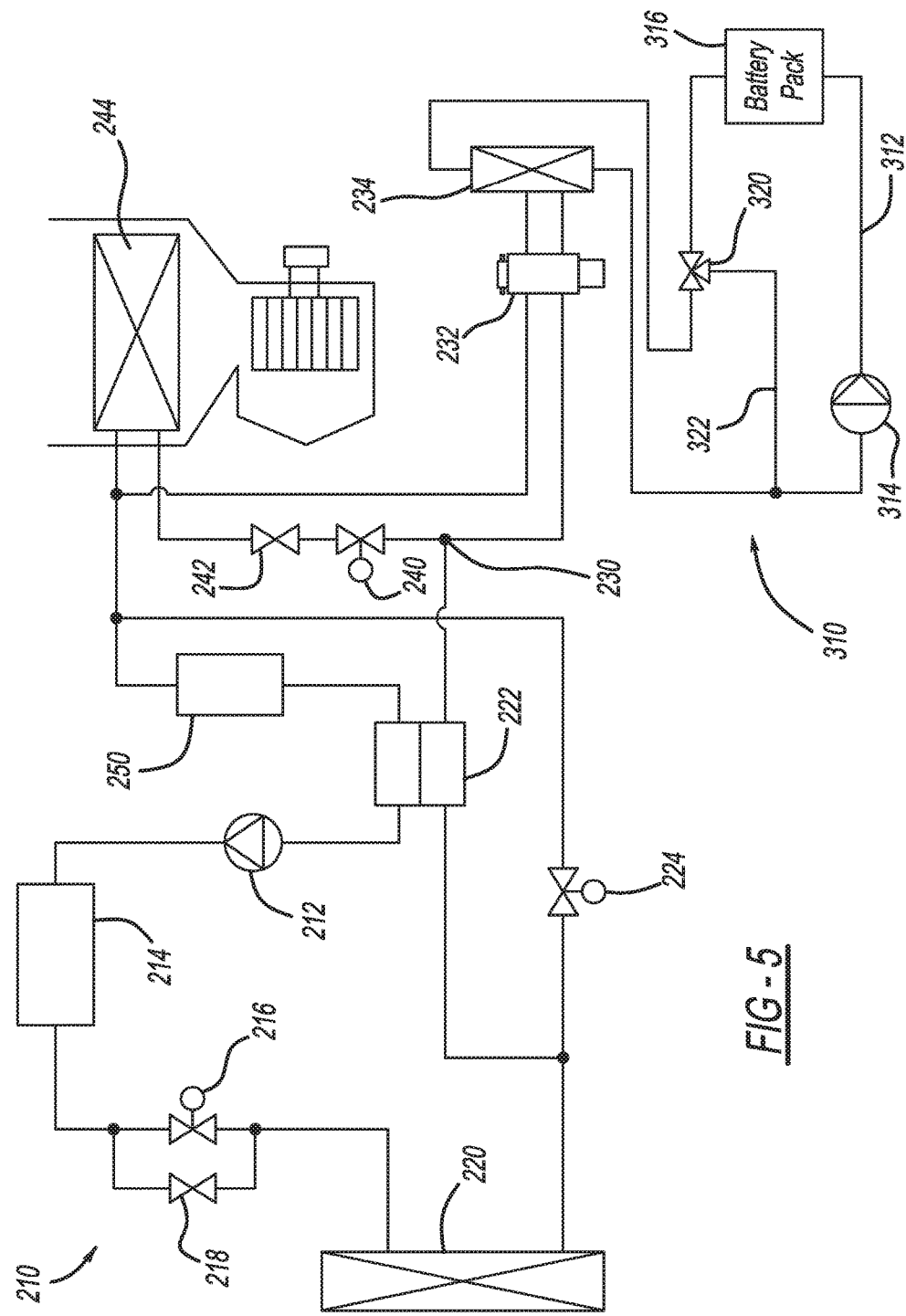
FIG. 5 illustrates another exemplary cooling system according to the present teachings.

With additional reference to FIG. 5, an additional exemplary cooling system in accordance with the present teachings is generally illustrated at reference numeral 210. The cooling system 210 includes a compressor 212, which compresses refrigerant into a hot, high pressure gas, and pumps the hot high pressure gas through an optional water cooled condenser 214. The water cooled condenser 214 is an optional heat exchanger, which may be coupled to a coolant line of a vehicle heating system. From the water cooled condenser 214, the refrigerant flows through magnet valve 216, which typically remains open, so that the refrigerant bypasses orifice tube 218.

From the magnet valve 216, the refrigerant flows to outside heat exchanger 220, which is a condenser when the system 210 is operated as a cooling system. At the outside heat exchanger 220, the refrigerant changes state from a gas to a liquid, and exits the outside heat exchanger 220 as a high pressure liquid. When the system 210 is operated as a cooling system, valve 224 is always closed, and thus all of the refrigerant flows from the outside heat exchanger 220 through internal heat exchanger 222, which can operate to cool the high pressure liquid. From the internal heat exchanger 222, the high pressure liquid flows to split 230, which is similar to the split 32 of FIG. 2. From the split 230, a portion of the high pressure liquid flows through TXV 232, which is similar to, or the same as, TXV 54. The TXV 232 may include heater 56 as well. Thus the description of TXV 54, and the operation thereof, also applies to TXV 232. From the TXV 232, the refrigerant exits as a low pressure, low temperature two-phase gas and liquid, and passes through battery chiller 234. The battery chiller 234 is similar to, or the same as, chiller 58. Thus the description of the chiller 58 also describes the chiller 234.

The chiller 234 is in cooperation with battery coolant loop 310. The battery coolant loop 310 is similar to, or the same as, the battery coolant loop 70. Thus the description of the battery coolant loop 70 also applies to the battery coolant loop 310. The battery coolant loop 310 includes a coolant line 312, through which coolant is pumped by pump 314. The pump 314 pumps coolant through the coolant line 312 to battery pack 316 to cool the battery pack 316. From the battery pack 316 coolant is pumped to three-way valve 320, which is similar to, or the same as, the three-way valve 76. The description of the three-way valve 76, which is an active valve, is also sufficient to describe the three-way valve 320. From the three-way valve 320, coolant is either pumped from the chiller 234, or through bypass line 322. As described above in connection with the description of the three-way valve 76, three-way valve 320 can control the amount of coolant passing through the chiller 234 and influence on the amount of refrigerant that passes through the chiller 234 from the TXV 232. The refrigerant exits the battery chiller 234 as a low pressure superheated gas.

The system 210 further includes a valve 240, which is on a side of the split 230 opposite to the TXV 232. The valve 240 can be a magnet valve and is substantially similar to, or the same as, valve A 42 of FIG. 2. Downstream of the valve 240 is an orifice tube 242 and an evaporator 244. The valve 240, orifice tube 242, and evaporator 244 are substantially similar to, or the same as, valve A 42, orifice tube 44, and evaporator 46 of the cooling system 10 of FIG. 2, and thus the description of the valve 42, orifice tube 44, and evaporator 46 is also sufficient to describe the valve 240, the orifice tube 242, and the evaporator 244. Thus in the chiller cooling only mode, valve 240 is opened and closed by the control module 12 based on the subcool temperature of refrigerant flowing from the outside heat exchanger 220 to the split 230, as illustrated in FIGS. 3A and 3B, as well as in accordance with the method 110 of FIG. 4.

The refrigerant flowing from the chiller 234 as a low pressure superheated gas flows directly to accumulator 250. The low pressure superheated gas refrigerant is combined with low pressure, low temperature two-phase refrigerant flowing from the evaporator 244 in order to prevent the accumulator 250 from drying out. From the accumulator 250, low pressure saturated gas/vapor refrigerant flows to the compressor 212, and the refrigerant loop is repeated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for cooling a battery, the system comprising:
   a cabin cooling refrigerant pathway including a first valve, an evaporator, and an orifice tube between the first valve and the evaporator;
   a battery cooling refrigerant pathway including a second valve, a chiller, and a thermal expansion valve (TXV) between the second valve and the chiller;
   an accumulator configured to receive refrigerant from both the cabin cooling refrigerant pathway and the battery cooling refrigerant pathway;
   a battery coolant loop including a coolant pathway for directing coolant from the chiller to the battery to cool the battery, the coolant is configured to be cooled by the chiller; and
   a control module that controls the first valve and the second valve;
   wherein the control module is configured to:
      open the second valve to allow refrigerant to flow through the TXV, past the chiller, and to the accumulator, the chiller is configured to cool the battery coolant loop to cool the battery;
      maintain the first valve closed until refrigerant of a condenser outlet refrigerant pathway reaches a predetermined subcool temperature; and
      open the first valve when refrigerant of the condenser outlet refrigerant pathway reaches the predetermined subcool temperature.

2. The system of claim 1, wherein the evaporator is configured to cool a passenger cabin of a vehicle.

3. The system of claim 1, further comprising a compressor and a condenser downstream from the accumulator with respect to refrigerant flow from the accumulator to the cabin cooling refrigerant pathway and the battery cooling refrigerant pathway;
   wherein refrigerant exiting the accumulator is configured to pass to the compressor, then to the condenser, and then to both the cabin cooling refrigerant pathway and the battery cooling refrigerant pathway.

4. The system of claim 1, wherein the battery coolant loop includes:
   a pump configured to pump coolant through the battery coolant loop; and
   a bypass valve operable to direct coolant through a bypass line and around the chiller.

5. The system of claim 4, wherein the bypass valve is an active valve that is configured to control battery coolant flow across the chiller based on temperature of the battery.

6. The system of claim 1, further comprising a heater associated with the TXV to heat the TXV and maintain the TXV open.

7. The system of claim 6, wherein in a battery cooling only mode the control module is configured to:
   maintain the first valve closed; and
   activate the heater to maintain the TXV open.

8. The system of claim 1, wherein in a combined battery cooling and cabin cooling mode the control module is configured to cause, the first valve and the second valve is configured to flow remain open.

9. A method for cooling a battery configured to at least partially propel a vehicle, the method comprising:
   closing a first valve of a cabin cooling refrigerant pathway including an evaporator and an orifice tube between the first valve and the evaporator;
   opening a second valve of a battery cooling refrigerant pathway including a chiller and a thermal expansion valve (TXV) that is between the second valve and the chiller, opening the second valve allows refrigerant to flow through the TXV, past the chiller, and to an accumulator, the chiller cools a battery coolant loop to cool the battery;
   maintaining the first valve closed until refrigerant of a condenser outlet refrigerant pathway reaches a predetermined subcool temperature, the condenser outlet refrigerant pathway is upstream from the cabin cooling refrigerant pathway and the battery cooling refrigerant pathway;
   opening the first valve when refrigerant of the condenser outlet refrigerant pathway reaches the predetermined subcool temperature;
   maintaining the first valve open for a predetermined period of time; and
   closing the first valve after expiration of the predetermined period of time.

10. The method of claim 9, wherein at the predetermined subcool temperature the accumulator begins to dry out.

11. The method of claim 9, wherein the predetermined period is sufficient to prevent the accumulator from drying out.

12. The method of claim 9, further comprising controlling coolant flow across the chiller in the battery coolant loop based on temperature of the battery.

13. The method of claim 12, further comprising actively controlling coolant flow across the chiller in the battery coolant loop with a valve.

14. The method of claim 13, further comprising controlling coolant flow across the chiller in the battery coolant loop by controlling coolant flow through a bypass pathway of the battery coolant loop that bypasses the chiller.

15. The method of claim 9, further comprising directing refrigerant through the evaporator to cool a passenger cabin of a vehicle.

16. The method of claim 9, further comprising controlling the closing of the first valve and the opening of the second valve with a control module.

17. The method of claim 9, further comprising activating a heater associated with the TXV to open the TXV.

18. A system for cooling a battery, the system comprising:
   a cabin cooling refrigerant pathway including a first valve and an orifice tube through which refrigerant is configured to flow to an evaporator;
   a battery cooling refrigerant pathway including a second valve and a thermal expansion valve (TXV) through which refrigerant is configured to flow to a chiller;
   an accumulator configured to receive refrigerant from both the cabin cooling refrigerant pathway and the battery cooling refrigerant pathway;
   a battery coolant loop including a coolant pathway for directing coolant from the chiller to the battery to cool the battery, the coolant is configured to be cooled by the chiller; and
   a control module that controls the first valve and the second valve;
   wherein the control module is configured to:
      open the second valve to allow refrigerant to flow through the TXV and past the chiller, the chiller is configured to cool the battery coolant loop to cool the battery;

maintain the first valve closed until refrigerant of a condenser outlet refrigerant pathway reaches a predetermined subcool temperature; and open the first valve when refrigerant of the condenser outlet refrigerant pathway reaches the predetermined subcool temperature.

\* \* \* \* \*

UNITED STATES PATENT AND TRADEMARK OFFICE
CERTIFICATE OF CORRECTION

PATENT NO. : 10,226,980 B2
APPLICATION NO. : 15/467624
DATED : March 12, 2019
INVENTOR(S) : Shan et al.

Page 1 of 1

It is certified that error appears in the above-identified patent and that said Letters Patent is hereby corrected as shown below:

Column 9, Claim 8, Lines 64-65, delete "is configured to flow" and insert --to-- therefor Signed and Sealed this
Thirtieth Day of July, 2019

Andrei Iancu
*Director of the United States Patent and Trademark Office*